United States Patent
Wilson

[11] Patent Number: 5,806,627
[45] Date of Patent: Sep. 15, 1998

[54] HELICOPTER STAIRS

[76] Inventor: Thomas Gray Wilson, 359 Rice Hill School Rd., McKee, Ky. 40447

[21] Appl. No.: 530,596

[22] Filed: Sep. 19, 1995

[51] Int. Cl.$^6$ ...................................................... B64D 9/00
[52] U.S. Cl. .......................... 182/127; 182/90; 244/129.6
[58] Field of Search ..................................... 182/117, 118, 182/121, 180, 181, 227, 128, 129, 224, 225, 13, 127, 90, 91, 106, 47; 244/129.6, 147, 137.1; 52/98, 736.3; 414/469, 786, 409; 220/268; 225/2, 15; 138/174

[56] References Cited

U.S. PATENT DOCUMENTS

| | | | |
|---|---|---|---|
| 1,335,302 | 3/1920 | Stout . | |
| 2,647,677 | 8/1953 | Reed | 228/48 |
| 2,722,237 | 11/1955 | Rosel | 138/174 |
| 3,582,032 | 6/1971 | Placek | 248/317 |
| 3,778,011 | 12/1973 | Cannon | 244/137 R |
| 3,904,155 | 9/1975 | Chavis | 244/118 R |
| 4,269,384 | 5/1981 | Saeed et al. | 248/548 |
| 4,299,059 | 11/1981 | Smith | 49/401 |
| 4,432,527 | 2/1984 | Sample | 248/548 |
| 4,568,008 | 2/1986 | Hasselquist et al. | 225/2 |
| 4,583,334 | 4/1986 | Hubbard | 52/98 |
| 4,610,432 | 9/1986 | Lewis et al. | 256/65 |
| 4,932,626 | 6/1990 | Guillot | 248/548 |
| 5,178,494 | 1/1993 | Zitz et al. | 405/290 |
| 5,228,707 | 7/1993 | Yoder | 280/166 |
| 5,269,565 | 12/1993 | Langner | 285/2 |
| 5,529,276 | 6/1996 | Szablya | 248/548 |
| 5,558,455 | 9/1996 | Emery | 403/2 |

Primary Examiner—Alvin C. Chin-Shue
Attorney, Agent, or Firm—Wood, Herron & Evans, LLP

[57] ABSTRACT

A stair construction for a vehicle is attached to the vehicle at a position below a vehicle door and supports the weight of users entering and exiting the vehicle. In the event of forces that tend to bend or push the stairs upward into interference with the door, the stairs will fracture and break or generally predictably deform so that they do not interfere with the door.

25 Claims, 3 Drawing Sheets

HELICOPTER STAIRS

FIELD OF THE INVENTION

The invention relates generally to stairs for entering and exiting a vehicle, and more particularly, to aircraft stairs and improvements thereto.

BACKGROUND OF THE INVENTION

On many vehicles, the vehicle door is located several feet above the ground; and therefore, steps or stairs are typically mounted to the vehicle at a location below the door. The stairs permit persons to step up to the door upon entering the vehicle or, step down from the door upon exiting the vehicle. On some types of vehicles, for example, helicopters, referring to FIG. 1, the stairs 20 include steps 22 that are spaced or strung along and rigidly connected to one or more step supports, such as runners or stringers 24. The stringers 24 have one end riveted or otherwise rigidly connected to the helicopter body 26 below the door 28. The steps include gussets 30 at their sides and a riser 32 for additional strength. The step support extends downward from the helicopter body toward the ground. To facilitate the entrance and exiting process, the step support is sloped, that is, it extends downward at an angle away from the helicopter door. Therefore, when leaving the helicopter each successive step downward is also spaced further from the helicopter body which facilitates walking up and down the stairs.

Under normal conditions, when the helicopter is resting on the ground, the lower step is approximately one step rise, for example, approximately nine inches, above the ground. However, a helicopter, by its nature of being able to vertically take off and land, has the flexibility of landing on uneven or soft terrain. If landing on uneven terrain, a rock, tree stump or high ground can hit, or interfere with, the lower end of the stairs can be pushed upward, thereby damaging the stair supports or the helicopter body itself. In other situations, where the helicopter is landing in soft terrain, the skids or wheels supporting the helicopter body may sink into the ground. Again, if the stairs contact harder ground, or objects on the ground, they will bend and deform. The stairs may also be bent or deformed by helicopter landings which are at an angle or are harder than normal and cause the helicopter to bounce.

All of the above landing conditions will exert abnormal forces on the stairs causing damage. Under more severe conditions, the stairs may be pushed upward to the extent that they partially or completely block the helicopter door from opening. In other situations, the upward forces on the stairs may partially collapse the helicopter body as well as bend the stair supports. The helicopter body may be severely bent, dented or collapsed to the extent that the distortion of the body jams the door and prevents it from being opened. All of the above conditions have the disadvantage of inhibiting or prohibiting access to and from the helicopter through the door.

Accordingly, it is an object of this invention to provide improved stairs for a helicopter which do not damage the airframe or block the helicopter door if the stairs are jammed or engaged by an obstruction during operations.

SUMMARY OF THE INVENTION

The present invention provides a stair construction for a vehicle, such as a helicopter, that will not block passage through a door of the vehicle upon damage or deformation of the stair. More particularly, the invention provides an improved stair structure for a helicopter which will not inhibit opening of a door even if the stairs are pushed, jammed or broken as a result of a hard or an unusual landing, such as a landing on soft or uneven terrain.

To this end, an embodiment of the present invention includes stairs having a step support connected to a helicopter below the door of the helicopter. The step support includes steps connected thereto, and the step support has a frangible area that breaks when the step support is subjected to a force of a predetermined magnitude and direction that would otherwise tend to deform the stairs into a position interfering with the proper operation of the door.

Such a frangible area may be accomplished by scoring or perforating the step support, preferably at a location within the frangible area. Alternatively, the breaking of the step support or stringer may be facilitated by any of various means designed to cut or split the step support lengthwise when the step support is put under compression. In one such embodiment, a wedge-shaped member is disposed in the step support with its wedge edge oriented to split the step support in response to forces placing the step support under compression. Thus, a force of sufficient magnitude exerted on the step support, such as from a hard landing on uneven ground, will push the step support against the wedge edge. Therefore, the step support of the stairs will be cut or split which prevents jamming of the helicopter door and minimizes damage to the helicopter.

In another embodiment, the splitting of the stringer is facilitated by means of a flared or frustoconical surface disposed with respect to the step support and having a larger diameter nearer to the helicopter. When the step support is pushed inward toward the helicopter, the increasing diameter of the flared surface spreads and splits the step support. Alternatively, the frustoconical surface may have longitudinally extending ridges to further facilitate splitting of the stringer.

In yet another embodiment of the invention, a breaker bar is disposed adjacent the step support. Therefore, a force from a landing or an obstruction against the stairs will push the step support against the breaker bar. As the step support is bent around the breaker bar by the force, the step support will fracture or break.

These and other objects and advantages of the present invention shall become apparent from the accompanying drawings and the detailed descriptions thereof.

DETAILED DESCRIPTION OF THE INVENTION

Figure 1:
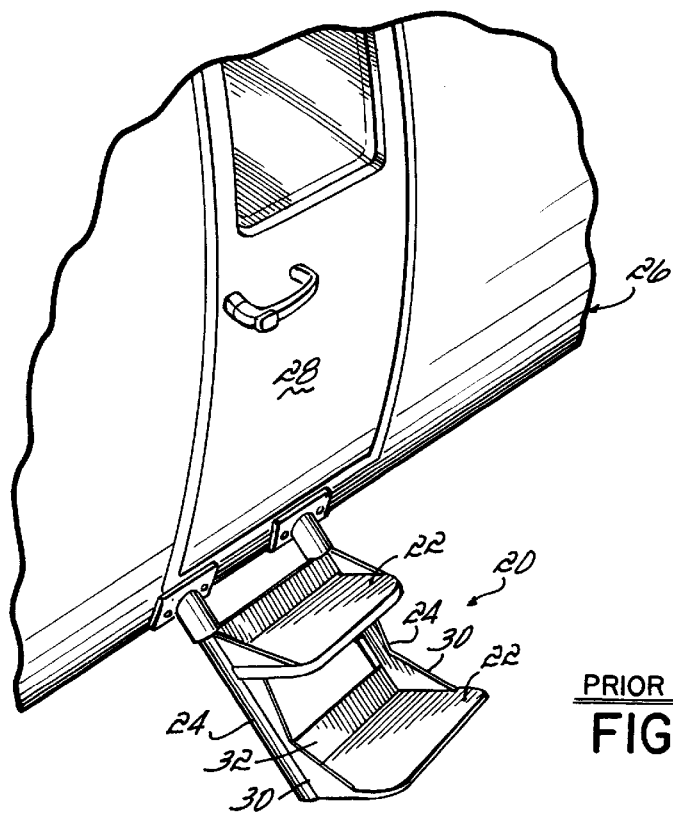
FIG. 1 is a partial perspective view illustrating a prior art stair construction for stepping up to and stepping down from a door on a helicopter.
Figure 2:
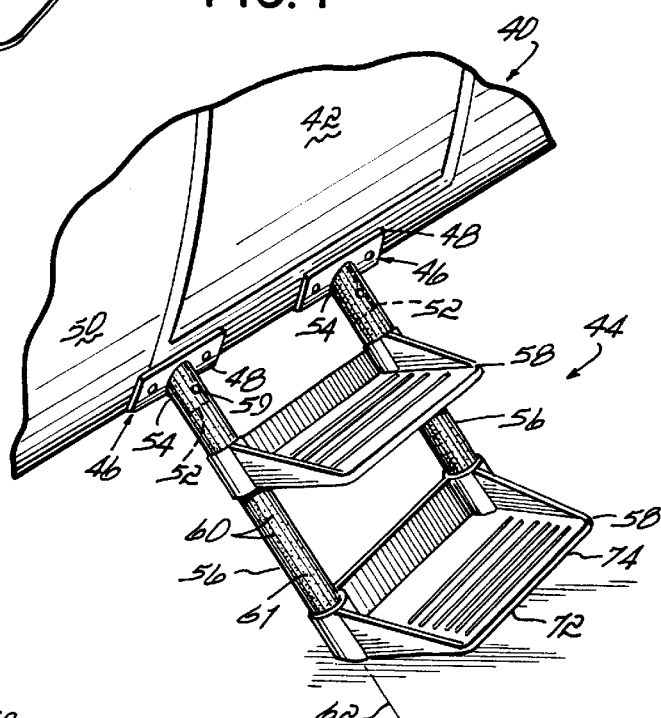
FIG. 2 is a perspective view of stairs for a vehicle constructed in accordance with the principles of the present invention.

FIG. 2 illustrates a portion of a body of a vehicle, for example, a helicopter, 40 that includes a door 42 below which stairs 44 are attached. The stairs 44 include a pair of mounts 46, each of which has a base plate 48 riveted or otherwise rigidly attached to an exterior surface 50 of the vehicle 40. Each mount 46 further includes a shaft or post 52 having one end connected to the base plate 48 and the other end extending outward from the base plate 48 and surface 50 in a generally perpendicular direction. The posts 52 extend into first ends 54 of step supports, such as runners or stringers 56 to which steps 58 are mounted. The posts 52 are connected to the ends 54 of the stringers 56 by fasteners, for example, pins, screws, etc. 59; or alternatively, the posts 52 and stringers 56 may be adhesively bonded or welded together.

The stringers or step supports 56 are preferably made from high tensile strength fibers 60 that are oriented along the length of the stringer 56 in a direction that is generally parallel to each of their longitudinal central axes 62. The high tensile strength fibers 60 are bonded together using a low compressive strength resin matrix 61 to hold the fibers together. The steps 58 can be made from any known applicable material, for example, a fiber reinforced material or metal. The steps 58 may be either adhesively bonded to the stringers 56 or connected to the stringers using fasteners or other known techniques.

Figure 3:
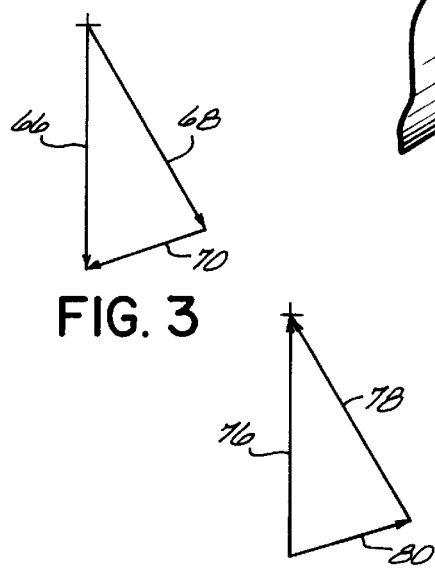
FIG. 3 is a vector force diagram depicting forces created by walking on the stairs.

Referring to FIG. 3, in use, as one steps up to or down from the door 42, a force is applied generally downward on the steps 58 as represented by the force vector 66. The force vector 66 has a first force component, as represented by the force vector 68, that extends longitudinally downward with respect to the stringer 56 and places the stringers 56 in tension. In addition, a second force component, as represented by the force vector 70, is exerted in a direction generally perpendicular to the center line 62, and applies a torque or twisting force with respect to the ends 54 of the stringers 56. With the high tensile strength fibers 60 in tension, the stairs 44 are very rigid and effective to support the weight of people stepping up to and stepping down from the door 42 in moving between the vehicle 40 and the landing pad or the ground 69.

Figure 4:
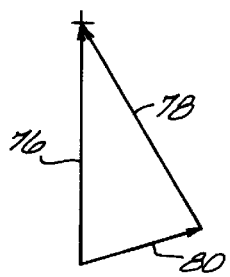
FIG. 4 is a vector force diagram depicting forces created by the stairs interfering with an object.

In abnormal landing situations, the bottom surface 72 of the lower step 74 may be pushed upward by a generally vertical force as illustrated by the force vector 76 of FIG. 4. That vertical force 76 has a first force component extending longitudinally upward with respect to the stringers 56 as represented by the force vector 78. In addition, a second force component extends in a direction generally perpendicular with respect to the central axis 62 of the stringers 56 as represented by the force vector 80. The force vector 78 places the stringers 56 under compression, and the force vector 80 causes the stringers 56 to rotate or bend with respect to the posts 52 of the mounts 46. When the force component 78 exceeds the compressive strength limit of the resin matrix holding the high tensile strength fibers 60 together, the low compressive strength resin matrix will break down, and the high tensile strength fibers will separate from the resin matrix. Therefore, the fibers 60 will move with respect to each other. In addition, the torsional force vector 80 will attempt to bend the stringers 56 which will cause a further fracturing and separation between the high tensile strength of fibers 60 and the low compressive strength resin matrix. Depending on the material of the high tensile strength fibers, the fibers themselves may simply bend or will fracture. For example, if the high tensile strength fibers are carbon fibers, as the low compressive strength resin matrix breaks down in response to the force 78, and the carbon fibers begin to bend in response to the force 80, the carbon fibers will break or fracture into separate pieces. Therefore, the stringers 56 will break or fracture in response to the force 76. Alternatively, if the stringers 56 are made from an aramid composite material, such as that marketed under the trademark "KEVLAR", when the low compressive strength resin matrix breaks down in response to the force 78, the force 80 will simply bend the fibers 60. In essence, the stringers will flex where the resin matrix has fractured.

Figure 5:
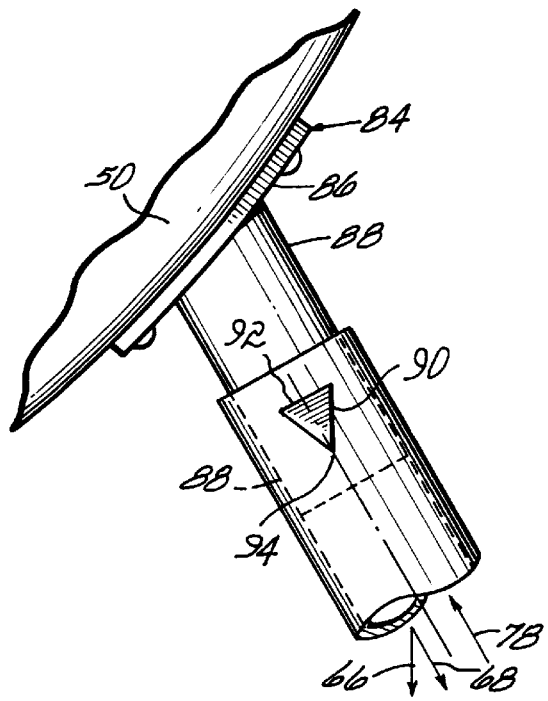
FIG. 5 is a partial front view of one embodiment of the invention for facilitating the breaking of the stair supports when subjected to an abnormal force.

FIG. 5 illustrates an alternative embodiment for mounting the ends 54 of the stringers 56 to the surface 50 of the vehicle 40. Since the embodiment may be the same for both stringers 56, only one stringer and mount is illustrated and described. In this embodiment, a mount 84 includes a base plate 86, which is riveted or otherwise rigidly attached to the surface 50. The mount further has a shaft or post 88 extending generally perpendicularly from the base plate 86 and away from the surface 50. A wedge-shaped pin 90 extends through the post 88 and is oriented to have the wide end 92 of the wedge directed toward the surface 50, and the sharp or pointed edge 94 of the wedge 90 facing away from the surface 50 in a direction generally parallel to the center axis 62 of the stringers 56. The edge 94 also extends through the side walls of the end 54 of the stringers 56. Therefore, when the steps 58 are subjected to a downward force 66 (FIG. 3) as in normal operation, the stringer 56 is put in tension, and the load force 68 (FIG. 3) is spread over the upper surface 92 of the wedge 90. However, when the stairs are subjected to an abnormal force 76 resulting from a hard landing or other condition, a compressive force 78 (FIG. 4) is exerted along stringer 56 toward the surface 50, which pushes the end 54 of the stringer 56 over the post 88 and against the base plate 86. The sharp edge 94 of the wedge 90 cuts or splits the end 54 of the stringer 56 as it moves upward to further enhance the fracture and collapse of the stringer 56.

Figure 6:
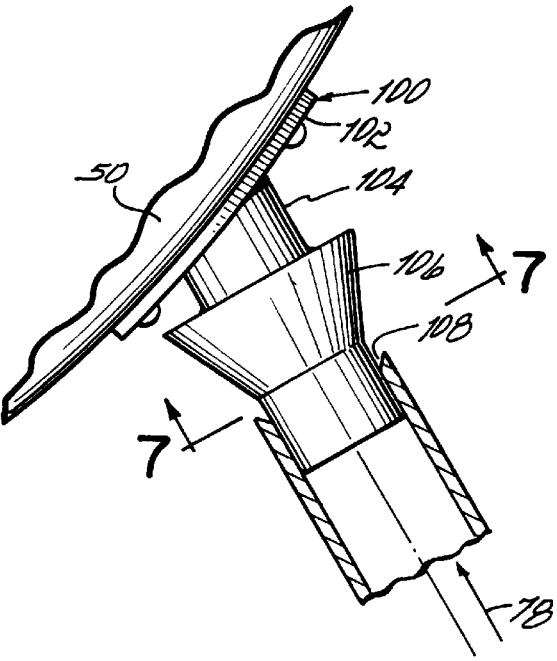
FIG. 6 is a partial front view of another embodiment of the invention for facilitating the breaking of the stair supports when subjected to an abnormal force.
Figure 7:
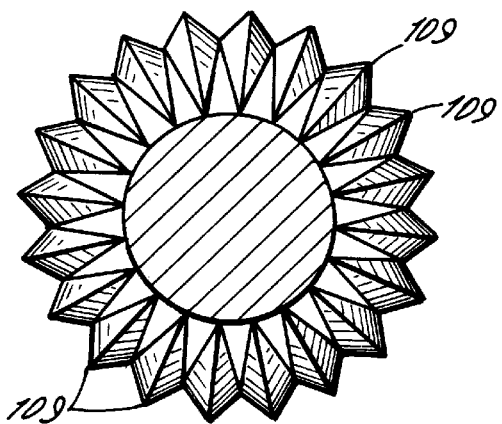
FIG. 7 is an end view of another version of the embodiment shown in FIG. 6, taken along lines 7—7 of FIG. 6.

FIG. 6 shows a further embodiment in which a mount 100 has base plate 102 riveted or otherwise rigidly secured to the surface 50 of the vehicle 40. Again, since the construction may be the same for each stringer, only a single stringer and mount is illustrated and described. A post or shaft 104 extends outwardly from the base plate 102 and is inserted into the end 54 of the stringer 56. The shaft 104 has a flaring surface 106 that is preferably rigidly connected to the shaft 104. Therefore as the stringer 56 experiences forces along its longitudinal axis 62 toward the surface 50, as indicated by the force vector 78 of FIG. 4, the stringer 56 moves over the shaft 104 toward the frustoconical surface 106. The frustoconical surface 106 is effective to spread and split the stringer 56. That action may be facilitated by chamfering or tapering the inside edge 108 at the end 54 of the stringer 56. Further, the splitting of the stringer 56 can be further facilitated by replacing the smooth frustoconical surface 106 of FIG. 6 with a frustoconical surface having ridges or edges 109 extending longitudinally as illustrated in FIG. 7.

Figure 8:
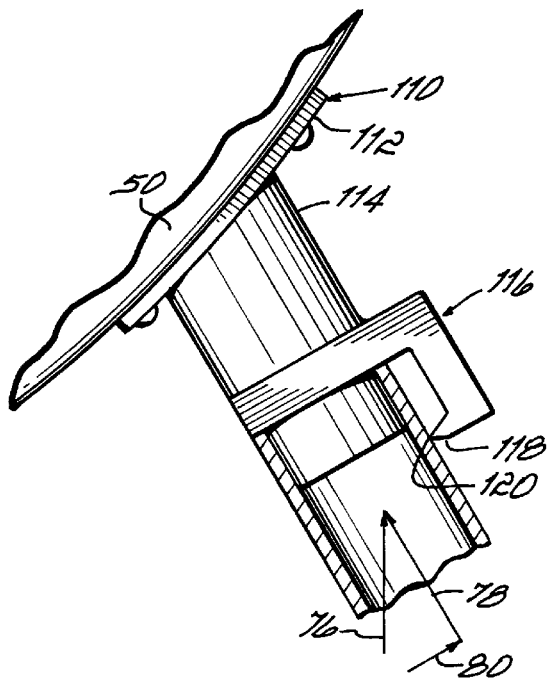
FIG. 8 is a partial front view of a further embodiment of the invention for facilitating the breaking of the stair supports when subjected to an abnormal force.

Referring to FIG. 8, in a further embodiment of the invention, a stringer support 110 has a base plate 112 riveted or otherwise rigidly secured to the surface 50 of the vehicle 40. A post or shaft 114 extends from the base plate 112 and has mounted thereon a breaker bar 116. Although FIG. 8 illustrates only a single post, as will be appreciated, the same construction can be applied to both stringers 56. The breaker bar 116 has a blade 118 with a pointed edge 120. If a hard landing causes a vertically directed force, as indicated by the force vector 76 (FIG. 4), that force will have two components. One force component 78 acts in a longitudinal direction and toward the surface 50 along the stringer 56. A second force component 80 acts in a direction generally perpendicular to the longitudinal direction. The force component 80 applies torque or rotation to the stringer 56 with respect to the shaft 114 and the blade 118 on breaker bar 116. As the low compressive strength resin matrix breaks apart in response to the compressive forces indicated by force vector 78, the fibers making up the stringer 56 will be pushed over and bent around the blade 118. If those fibers are carbon fibers, the edge 120 on blade 118 will facilitate the fracture and breaking of those fibers. Preferably, the blade 120 extends over a substantial and even major portion of the circumference of the stringer 56 to facilitate fracturing and breaking of the stringer 56 in response to forces caused by hard or unusual landings. By extending the blade 118 around the circumference of the stringer 56, the blade is more effective to fracture regardless of the direction of the fracturing force.

Figure 9:
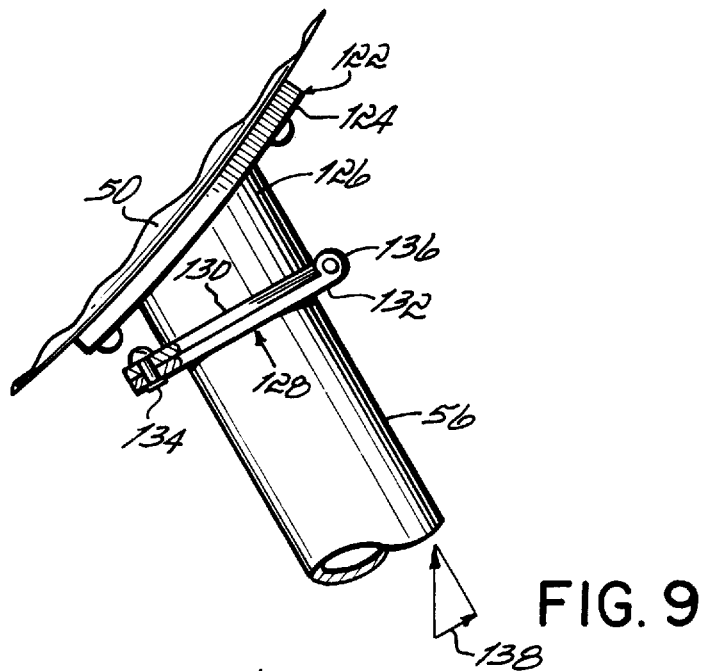
FIGS. 9 and 10 are partial front views of a further embodiment of the invention for facilitating the breaking of the stair supports when subjected to an abnormal force.
Figure 10:
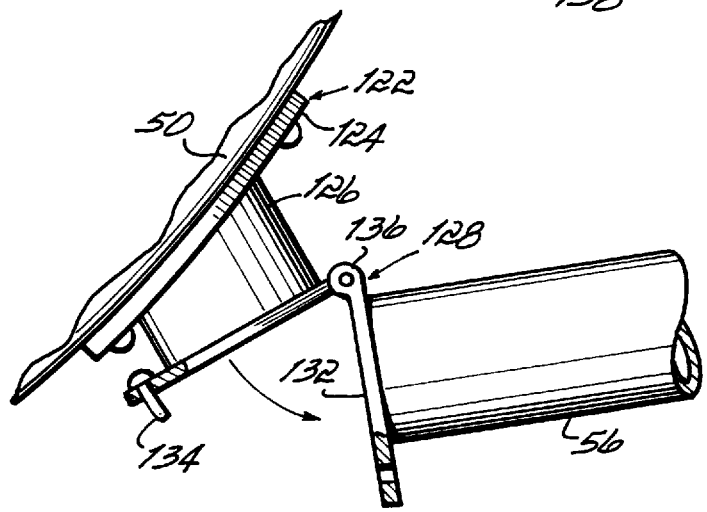

Yet another embodiment of the invention is shown in FIG. 9. A stringer support 122 has a base plate 124 riveted or otherwise rigidly secured to the surface 50 of the vehicle. A post or shaft 126 extends from the base plate 124 and has secured to its end farthest from the surface 50 one leg 130 of a hinge 128. The leg 130 of the hinge 128 may be secured to the shaft 126 by means of screws, rivets, or other fasteners, or it may be adhesively or otherwise bonded to the shaft 126. The other leg 132 of the hinge 128 is likewise fastened or bonded to the stringer 56. Under normal operating conditions, the hinge 128 is maintained in a closed position as shown in FIG. 9 by means of a frangible retainer clip 134. The pivot point 136 of the hinge 128 is located such that forces exerted by persons ascending or descending the stairs tend to close the hinge 128. However, when an abnormal upward force is exerted as shown in FIG. 9, the force component 138 perpendicular to the stringer 56 tends to open the hinge 128. If the force 138 is of sufficient magnitude, the retainer clip 134 breaks, allowing the hinge 128 to open as shown in FIG. 10 and thereby prevent damage to the stringer support 122 and vehicle surface 50. Repairing the stairs is then a simple matter of replacing the broken retainer clip.

In the examples described above, the fracturing force is illustrated as being a generally vertical force; however, the location of obstructions that may be hit in abnormal situations is unpredictable. Therefore, the exact direction of the fracturing force is also unpredictable. The fracturing forces, while generally created by striking an object below the stairs, may also be created by an object striking the stairs from a lateral or sideways or partially sideways direction. The stair construction as described and illustrated in the above examples has an advantage of allowing the structure of the stairs to bend, fracture or break, thereby preventing interference with the door of the vehicle. Further, the deformation and fracture of the stair structure minimizes damage to the main body portion of the vehicle.

While the invention has been set forth by a description of the preferred embodiments in considerable detail, it is not intended to restrict or in any way limit the claims to such detail. Additional advantages and modifications will readily appear to those who are skilled in the art. For example, while the stringers 56 have been described as being made from a fiber-reinforced material, they may be made from other materials, for example, a plastic or a metal such as aluminum. The stringers 56 may be made from any material which exhibits the necessary physical characteristics, that is, providing sufficient support to permit persons to step up to and step down from the door of the vehicle but break away, fracture, or otherwise generally predictably deform in response to forces that tend to twist, bend or push the stairs generally upward. Further, in the described embodiment, the whole of the step support is frangible; however, it will be appreciated that the step support can have only an area or portion thereof that is frangible in response to a compression load or force. As will further be appreciated, the steps 58 may be made of any material and connected to the stringers in any manner.

In the embodiment illustrated in FIG. 2, the stairs 44 are supported by a pair of stringers 56. However, the steps 58 may alternatively be supported by a single stringer, preferably located centrally along the rear edge of the steps. Further, the stringer 56 can be circumferentially scored at the one end 54 to facilitate a fracture or breaking of the stringer along the score line. The stringer may have a circular cross-section, or it may have a square, rectangular, or other polygonal cross-section. Further, while different devices have been separately illustrated in FIGS. 5–8 for facilitating the fracturing of the stringers, those devices may be used in combinations with each other or other similar devices.

The invention, in its broadest aspects, is therefore not limited to the specific details shown and described. Accordingly, departures may be made from the details described herein without departing from the spirit and scope of the invention and applicant intends to be bound only by the claims appended hereto.

What is claimed is:

1. Stair apparatus for climbing up to and exiting down from a door of a helicopter comprising:

a step support having a first end adapted to be connected to the helicopter below the door;

a step connected to the step support to facilitate climbing up to and exiting down from the door; and the step support including a frangible portion disposed between the step and the first end, the frangible portion adapted to secure the step and step support to the helicopter and for supporting tensile loads imposed by users climbing up to and exiting down from the door, and the frangible portion adapted to break away when the step support is exposed to a predetermined force tending to permit bending of the step support upwardly.

2. The stair apparatus of claim 1 wherein the step support is scored to weaken and facilitate the step support breaking at the score.

3. The stair apparatus of claim 2 wherein the step support is scored at a location within the frangible area.

4. The stair apparatus of claim 1 wherein the step support is perforated to weaken and facilitate the step support breaking at the perforation.

5. The stair apparatus of claim 4 wherein the step support is perforated at a location within the frangible area.

6. The stair apparatus of claim 1 further including a wedge member having a wedge edge and disposed in the step support, the wedge edge being oriented with respect to the step support to split the step support in response to forces placing the step support under compression, thereby pushing the step support over the wedge member to minimize bending of the step support and also minimize damage to the helicopter.

7. The stair apparatus of claim 6 wherein the wedge is conically shaped.

8. The stair apparatus of claim 1 further comprising a break edge disposed adjacent the step support, the break edge contacting the step support in response to forces placing the step support under compression and pushing the step support against and over the break edge to sharply bend and break the step support, thereby minimizing damage to the helicopter.

9. The stair apparatus of claim 1 wherein the step support further comprises a pair of stringers having first ends adapted to be connected to the helicopter below the door, and one of the stringers having a frangible area for breaking when the one of the stringers is exposed to predetermined forces tending to bend the one of the stringers.

10. The stair apparatus of claim 9 wherein both stringers of the pair of the stringers have frangible areas that break when the pair of stringers is exposed to predetermined forces tending to bend the pair of stringers.

11. The stair apparatus of claim 1 further comprising a plurality of steps connected to the step support in a spaced relationship to facilitate climbing up to and exiting down from the door of the vehicle.

12. Stair apparatus for climbing up to and exiting down from a door of a vehicle comprising:

a step support having first ends adapted to be connected to the vehicle below the door;

a plurality of steps connected in a spaced relationship to the step support to facilitate climbing up to and exiting down from the door; and the step support having a frangible portion disposed between the steps and the first ends, the frangible portion adapted to secure the steps and step support to the vehicle and for supporting tensile load forces applied to the plurality of steps that place the step support in tension, and the frangible portion adapted to break away in response to forces placing the step support under compression, thereby minimizing damage to the vehicle in response to the forces placing the step support under compression.

13. The stair apparatus of claim 12 wherein the step support is made of high tensile strength fibers having lengths oriented generally longitudinally along the step support, and the high tensile strength fibers being held together with a low compressive strength resin matrix.

14. The stair apparatus of claim 13 wherein the step support further comprises a pair of stringers having first ends adapted to be connected to the vehicle below the door, and one of the stringers having the frangible portion.

15. The stair apparatus of claim 14 wherein both stringers of the pair of the stringers have frangible portions that break when the pair of stringers is exposed to predetermined forces tending to bend the pair of supports.

16. The stair apparatus of claim 15 wherein the pair of stringers is connected to the vehicle in a generally parallel relations hip.

17. The stair apparatus of claim 16 wherein one of the pair of the stringers has score lines to weaken and facilitate the pair of stringers breaking at the score lines.

18. The stair apparatus of claim 16 wherein one of the pair of stringers has perforations to weaken and facilitate the pair of stringers breaking at the perforation.

19. The stair apparatus of claim 16 further including a wedge member having a wedge edge and disposed with respect to one of the pair of stringers, the wedge edge being oriented with respect to the one of the stringers to split the one of the stringers in response to forces placing the one of the stringers under compression.

20. The stair apparatus of claim 19 wherein the wedges are conically shaped.

21. The stair apparatus of claim 16 further comprising a breaker bar disposed adjacent one of the pair of stringers, the breaker bar contacting the one of the stringers in response to forces placing the pair of stringers under compression and that push the one of the stringers against and over the breaker bar to sharply bend and break the one of stringers and minimize damage to the vehicle.

22. Stair apparatus for climbing up to and exiting down from a door of a vehicle comprising:

a step support having a first end adapted to be connected to the vehicle below the door;

a step connected to the step support to facilitate climbing up to and exiting down from the door; and the step support having a hinged portion and a frangible portion supporting downwardly acting load forces applied to the step, said frangible portion breaking and said hinge portion opening in response to upwardly acting load forces applied to the step support, thereby minimizing damage to the vehicle from the upwardly acting forces.

23. The stair apparatus of claim 22 wherein the step support comprises a pair of stringers having first ends adapted to be connected to the vehicle below the door, each of the stringers having the hinge portion.

24. The stair apparatus of claim 23 wherein the hinged portion comprises a hinge having first and second leg members pivotally interconnected at their proximal ends, the first and second leg members being capable of rotating with respect to each other from a closed position in which the first and second leg members are in close proximity at their distal ends and are approximately parallel to one another, to an open position in which the first and second leg members form an acute angle.

25. The stair apparatus of claim 24 wherein the frangible portion comprises a frangible retainer clip attached to the first and second leg members when the hinge is in the closed position, the retainer clip being adapted to hold the first and second leg members in the closed position under normal conditions and further being adapted to break in response to an abnormal force of a predetermined magnitude tending to open the hinge, thereby permitting the hinge to open and thereby minimizing damage to the vehicle from the abnormal force.

* * * * *